No. 800,959. PATENTED OCT. 3, 1905.
R. E. WAGELEY & J. F. STOCKE.
ADDING MACHINE.
APPLICATION FILED OCT. 15, 1902.

No. 800,959. PATENTED OCT. 3, 1905.
R. E. WAGELEY & J. F. STOCKE.
ADDING MACHINE.
APPLICATION FILED OCT. 15, 1902.

UNITED STATES PATENT OFFICE.

ROBERT E. WAGELEY AND JOHN F. STOCKE, OF ST. LOUIS, MISSOURI, ASSIGNORS OF FOURTEEN ONE-HUNDREDTHS TO EUGENE PHILLIPS, OF JOLIET, ILLINOIS, NINETEEN ONE-HUNDREDTHS TO CARROLL C. CHILD AND TWENTY-FIVE ONE-HUNDREDTHS TO SAMUEL S. PINGREE, BOTH OF ST. LOUIS, MISSOURI.

ADDING-MACHINE.

No. 800,959.          Specification of Letters Patent.          Patented Oct. 3, 1905.

Application filed October 15, 1902. Serial No. 127,406.

*To all whom it may concern:*

Be it known that we, ROBERT E. WAGELEY and JOHN F. STOCKE, citizens of the United States, residing at St. Louis, Missouri, have invented a certain new and useful Improvement in Adding-Machines, of which the following is a full, clear, and exact description, such as will enable others skilled in the art to which it appertains to make and use the same, reference being had to the accompanying drawings, forming part of this specification, in which—

This invention relates to a new and useful improvement in adding-machines, being designed particularly as an improvement upon the machine shown and described in United States Letters Patent granted to W. W. Hopkins, No. 683,939, dated October 8, 1901.

Our present invention consists in providing an error or correction key to the adding-machine of the said Hopkins patent, whereby when an example is set up on the keyboard the same may be taken out of the machine by operating the said error or correction key. By providing the said machine with an error or correction key it is possible by the manipulation of said key to retain totals in the machine to be reprinted and carried forward.

In the Hopkins patent aforesaid no means are provided whereby an example erroneously set up on the keyboard can be taken out of the machine, thus rendering it necessary to print the error on the record-strip and make the correction in the total of said error by a pen or pencil after the strip is removed from the machine. Furthermore, in said patent no means are provided for reprinting the total and carrying the total forward as the heading of another column; but, on the contrary, when a total is obtained the machine is automatically cleared, the adding mechanism being restored to zero position.

We will describe briefly the operation of the said Hopkins patented machine as shown in the accompanying drawings for the purpose of afterward explaining the operation of our invention, which is intimately identified with certain of the moving parts of said patented machine.

In the drawings, 1 indicates the base, and 2 the side frames, in which latter are journaled the several shafts of the machine.

Figure 3:
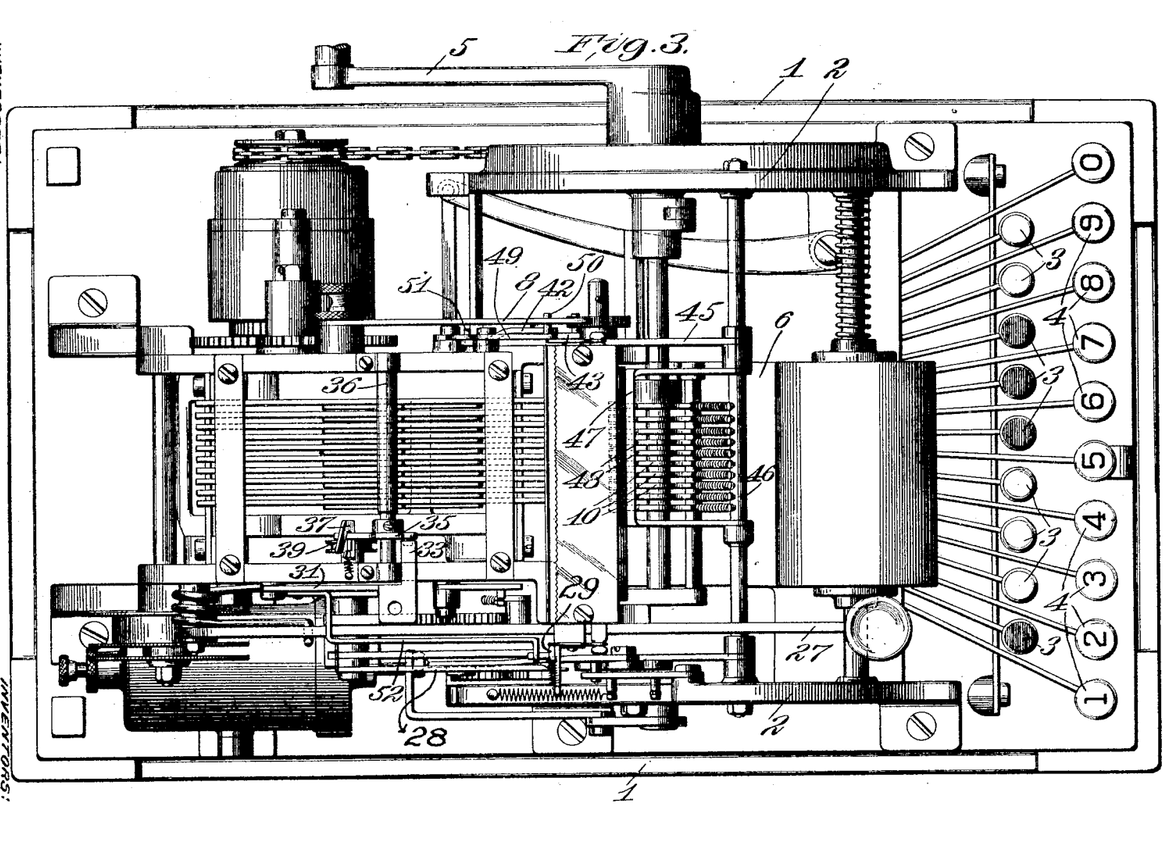
Fig. 3 is a top plan view.

3 indicates what are known as the "order-keys," which keys, nine in number, are arranged to control the highest order of the example set up in the machine. Referring to Fig. 3, it will be seen that the two order-keys at the right-hand side are white, indicating the "cents" and "dimes," respectively. The next three keys are colored—say, for instance, red—indicating units-dollars, tens-dollars, and hundreds-dollars. The next three keys are white, indicating thousands, tens of thousands, and hundreds of thousands, and the next key at the extreme left is colored, indicating the order million. In front of these order-keys are the number-keys 4, bearing numerals, starting from the left, from "1" to "9," inclusive, the key at the extreme right having the character "0." In setting up an example on the keyboard the order-key is first operated to set the control-carriage in the machine, as described in said patent aforesaid, after which the number-key indicating the number of that order to be registered in the machine is operated, and the successive operation of the number-keys will register successively lower orders in the adding mechanism. For instance, if an item of five hundred and thirty dollars and forty-one cents was to be placed in the machine the "hundreds-of-dollars" order-key, which is the middle key of the row, would be pressed, after which the "5" key, the "3" key, the "0" key, the "4" key, and the "1" key would be successively operated. Then if five cents were to be added as an item the first key at the right of the line of order-keys would be operated and "5" in the row of number-keys would be operated. Whenever an example is set up on the keyboard by the successive manipulation of the order and number keys as above described, the handle 5 is pulled forward by the operator, which effects the printing of the items on a strip of paper, disengages the totalizer-trains from the item-trains, and restores the item-trains to zero position, the final or return movement of the handle reëngaging the totalizer and item trains for another operation. The handle also operates the carrying devices identified with the totalizer-trains which are employed for transferring a number from a train identified with a column of lower order to the next adjacent train identified with a column of higher order.

Figure 4:
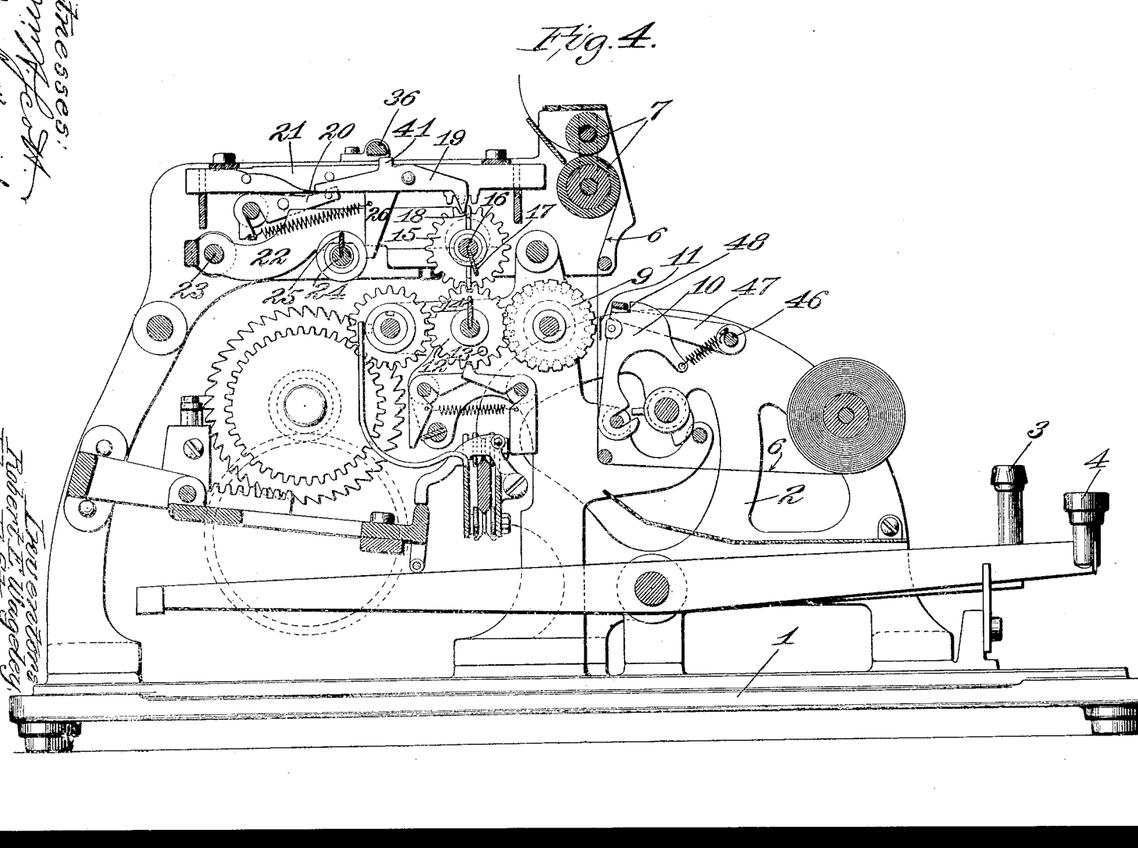
Fig. 4 is a longitudinal vertical sectional view.
Figure 5:
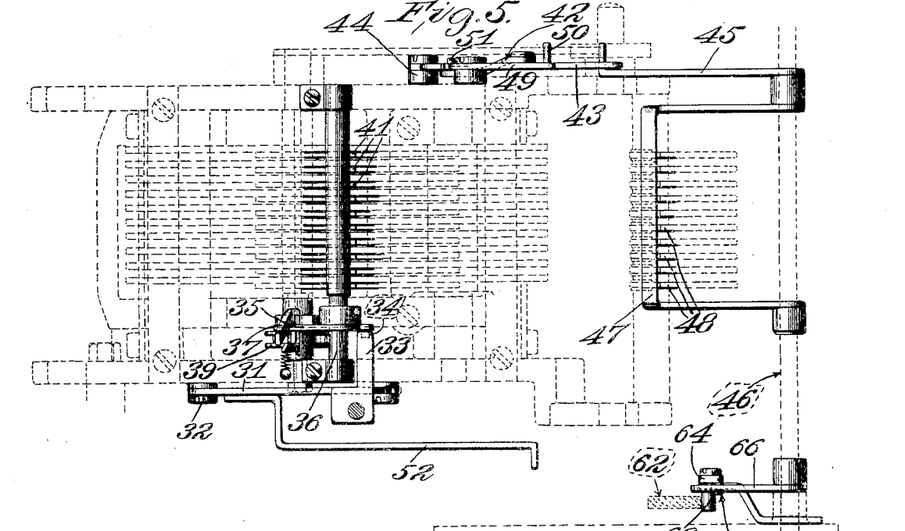
Fig. 5 is detail view showing our improvement in its relation to other parts of the machine.

Referring now to Fig. 4, 6 indicates a strip of paper which is fed from a roll by feed-rollers 7, said feed-rollers being operated at each operation of the operating-handle by a pawl 8. (See Fig. 1.) The strip of paper passes alongside of the periphery of printing-wheels 9, and the type-hammers 10 force the paper and the inking-ribbon 11 toward the type-wheels to make a printing impression in recording the items and the total thereof. 12 indicates a gear in the item-train in mesh with the type-wheel and provided with a pin 13, designed to coöperate with a restoring-arm 14, extending from the shaft upon which the gears 12 are loosely mounted. Whenever an item is set up in the machine, the gear 12 is rotated proportionately to the position of the operated number-key, the operated gear of course being identified with the column resulting from the manipulation of one of the order-keys 3. The item-trains thus move a predetermined distance upon the operation of a key identified therewith, and when the handle 5 is manipulated the item-trains are restored to zero position by the arms 14 engaging the pins 13, as is fully explained in said Hopkins patent referred to. 15 indicates a wheel in the totalizer-train normally in mesh with a gear 12 of its corresponding item-train, so that when the item-train is driven the totalizer-train is correspondingly driven; but before the item-train is restored the totalizer-train is disengaged therefrom, so as to retain the total in the totalizer-train. Otherwise the restoration of the item and totalizer trains would not only restore the item-trains to zero position, but take the item out of the totalizer-train. The several gears 15 constitute the totalizer-trains identified with the orders comprehended within the capacity of the machine and are loosely mounted on a shaft 16, which carries zero-arms 17, said zero-arms being used in taking a total by reversely rotating the totalizer-trains. To effect the printing upon the dual movement of the item-gears 12, which in placing an item in the totalizer-trains act as drivers for the type-wheels and for the totalizer-gears, but which in the taking of a total act as transmitting-gears whose movement is controlled by the extent of movement of the totalizer-gears connected therewith, and consequently the reverse rotation of the latter will reversely rotate the type-wheel, the type-wheel is provided with two sets of printing characters, as described in said patent. Both the item-gears 12 and the totalizer-gears 15 in the machine shown, which is designed for use in connection with the decimal system, have twenty teeth. The totalizer-gears 15 are provided with trips 18, so that when a totalizer-gear is moved a distance of ten teeth one of the trips 18 will actuate a pawl of lever 19, which coöperates and depresses a detaining-pawl 20, identified with a transferring slide-bar 21 of the next adjacent totalizer-train of higher order. This bar 21 (and there is a bar for each totalizer-gear) is provided with teeth in the path of movement of the totalizer-gear, thus constituting said bar a rack, so that when a wheel of lower order trips the pawl 19 the detaining-pawl 20 will release the rack-bar 21 of the next adjacent train of higher order and when the totalizer-trains are disengaged from the item-trains to enable the restoration of the item-trains the rack-bars 21 will be restored, and such of the rack-bars as have been tripped, as before described, will move their engaged totalizer-trains a distance of one tooth, thus advancing the train of higher order. Of course such rack-bars 21 as have not been tripped will remain stationary and merely serve to lock their associate totalizer-trains against displacement. The totalizer-trains are carried in a rocking frame 22, pivoted at 23, and the means for rocking said frame, so as to elevate the totalizer-trains out of mesh with the item-trains, consists of a shaft 24, having a flat face for supporting the frame 22. When this shaft is rocked, the frame is elevated, and as the shaft carries a plate 25 said plate will engage projections 26, extending from the rack-bars 21, which have been actuated, and restore said rack-bars and actuate the totalizer-trains after the frame 22 is elevated. 27 indicates the total-key, which is prevented from being operated when the operating-handle 5 is in other than a home position by means of a link 28, connected to a rock-arm on the end of rock-shaft 24, said link having a cam-face (see Fig. 3) which actuates a locking-pawl 29, having a shoulder designed to occupy a position under the total-key 27 whenever the operating-handle 5 is in other than a home position.

We have endeavored in the above to briefly describe the operation of the machine shown in the said Hopkins patent so far as the parts of said patented machine are related to or connected with our improvements. We have not gone into a detailed description of the entire machine nor of the operation of the numerous parts thereof, some of which are not shown in the accompanying drawings, because the same do not relate to nor are they connected in any way with our improvements. We rely upon Patent No. 683,939 for a more complete explanation of the machine, as we do not herein claim any of the parts above referred to, except as such parts may affect and be combined with elements of our improved error-key construction, all as will hereinafter be more particularly pointed out and afterward specified in the claims.

From what has been said above it is evident that to correct an item erroneously introduced by operating the wrong keys parts must operate in a particular way or be prevented from operating, as the case may be. In the correction (taking out) of a wrong item certain parts must upon the next operation of the handle be operated to (*a*) perform their usual functions, (*b*) to perform different functions, or (*c*) not perform any function at all.

The following briefly describes the effects produced by operating the error-key; also, the actions of the machine consequent upon the manipulation of the handle:

First. The operation of the error-key causes the totalizer-trains to remain in mesh with the item-trains. The subsequent operation of the handle in restoring the item-trains also rotates the meshed totalizer-trains and takes out the item last introduced therein.

Second. The operation of the error-key trips all the transferring devices, which insures clearance upon the reverse rotation of the totalizer-wheels when the handle is subsequently operated. The latter operation restores all the parts to normal position, or the position they occupied before the keys were operated to place a wrong item in the machine.

Third. When the error-key is operated, the type-hammers are not permitted to make a record of the example erroneously set up in the keyboard, although the hammers make a printing stroke upon the subsequent operation of the handle.

Fourth. When the error-key is operated, the paper will not be fed. Thus no blank space occurs in the record indicating that an error had been made and corrected, although the feed-pawl is vibrated, as usual, upon the subsequent operation of the handle.

Fifth. When the error-key is operated, the total-key is locked against operation and is only released when the handle is operated and has completed its work in taking out the wrong item.

Sixth. When the error-key is operated, the error-key is locked until the operating-handle completes its movement.

In the following description we will assume that an example has been set up on the keyboard and is in the item and totalizer trains. To take this item out of the machine and restore the machine to where it was before the item was set up in the keyboard, it is only necessary to depress the error-key 30 and operate the handle 5. In the following description we will describe the construction of our improvements under appropriate headings as outlined above.

Figures 7, 8:
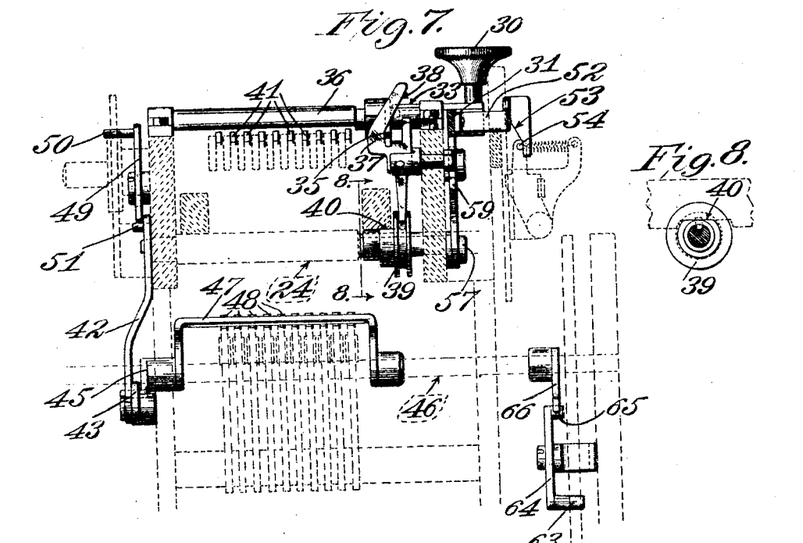
Fig. 7 is a sectional view on the line 7 7 of Fig. 6.
Fig. 8 is a sectional view on the line 8 8 of Fig. 7.
Figure 9:
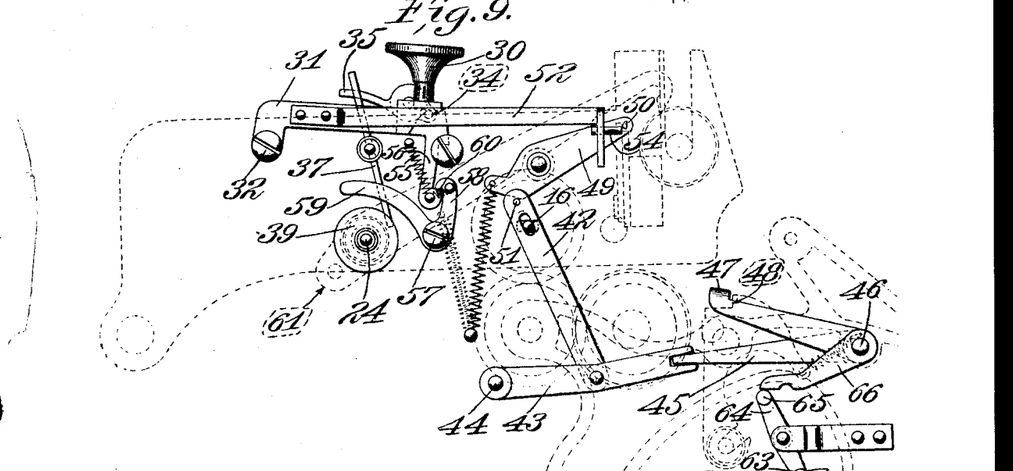
Fig. 9 is a view similar to Fig. 6, but showing the parts in different positions.

*Maintaining engagement between totalizer and item trains.*—The correction-key 30, which extends through the casing of the machine, is arranged upon the end of a lever 31, pivoted at 32. This lever has a lateral extension 33, which coöperates with a pin 34, mounted in a plate 35, upon a rock-shaft 36. The rear end of this plate 35 forms a finger which coöperates with a lever 37, suitably pivoted in a slotted post secured in the frame. Lever 37 has a cam-face 38 for coöperating with the finger 35, the lower end of said lever engaging a groove in a collar 39, feathered upon and slidable longitudinally on the shaft 24, heretofore described. This collar 39, as shown in Fig. 8, has a flat face 40, and when the shaft 24 is rocked in the ordinary operation of the machine this flat face 40 elevates the totalizer-frame to effect the separation of the totalizer and item trains.

By the above construction when the error-key is depressed the shaft 36 is rocked, causing the finger 35 to ride up the cam-face 38 and rock the lever 37, so as to slide the collar 39 on the shaft 24 and move the flat face 40 from under the frame 22, so that upon the next operation of the handle while the shaft 24 will be rocked the frame 22 will not be elevated, and in its lowered position the engagement between the totalizer and item trains is preserved. As the operating-handle will in the ordinary operation of the machine restore the item-trains to zero, it will be obvious that such restoration will actuate the meshed totalizer-trains and take out of said totalizer-trains the item erroneously set up on the keyboard. Thus so far as this feature of the invention is concerned the item and totalizer trains stand where they were before the example was erroneously set up on the keyboard, and the keyboard is cleared.

*Tripping the transferring devices.*—The rock-shaft 36 is flattened on its under side and coöperates with projections 41 on the pawls 19, (see Fig. 4,) so that whenever the error-key is depressed all of the pawls 19 are actuated and all of the rack-bars 21 are released. The release of the rack-bars is of no importance, being merely an incident to the raising of the pawls 19 out of the paths of movement of their coöperating trips 18 on the totalizer-gears, so that when the totalizer-gears are restored the pawls 19 will not interfere. If before the erroneous example was set up on the keyboard a totalizer-wheel stood at "9" and the erroneous example moved it a distance of one or more teeth, so as to trip its coöperating pawl 19 in readiness to actuate the totalizer-train of higher order upon the next operation of the operating-handle, it will be obvious that when the totalizer-train was restored to its former position it would be moved back the same distance it had been moved forward—to wit, to its "9" position—and so far as the actuated pawl and its coöperating rack-bar are concerned they stand tripped, and such position would mean nothing to the error-key and its connections except lessening the work of the error-key in operating the said parts.

Figure 6:
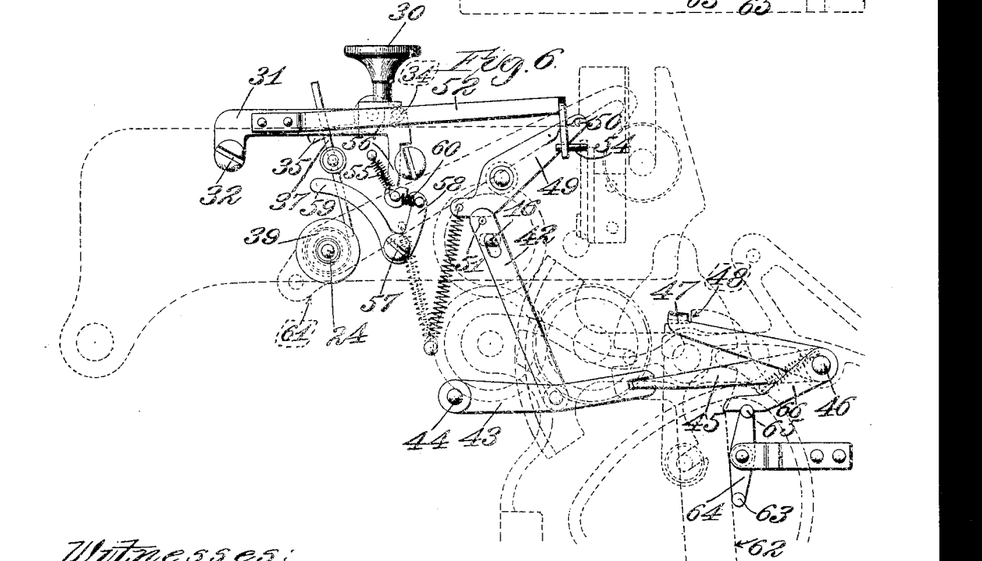
Fig. 6 is a side elevational view of our improvement, showing the same in its relation to other parts of the machine.

*Preventing the operation of the type-hammers.*— We do not with our invention in correcting an example set up on the keyboard throw the type-hammers out of commission, because when the example is set up one of the first things to be done by the manipulation of the operating-handle is to trip the type-hammers to effect a printing impression. Therefore with this condition to meet we prefer to let the machine operate as originally designed, and instead of throwing the type-hammers out of commission interrupt them and prevent them from making a printing impression at the commencement of the stroke of the operating-handle. This we accomplish as follows: Referring to Fig. 6, it will be observed that the totalizer-shaft 16 at one end passes through the slotted end of a link 42, which link is connected to a lever 43, pivoted at 44. Lever 43 engages a rock-arm 45, mounted upon a rock-shaft 46, said rock-shaft carrying a bail or yoke 47, the cross-piece of which is normally in the path of shoulders 48 on the type-hammers. Thus whenever the totalizer-trains are held in mesh with the item-trains the link 42 is not actuated and the yoke 47 remains in the path of the shoulders on the type-hammers, and such type-hammers as may be actuated simply strike with their shoulders 48 against the yoke and do not make a printing impression. Thus the yoke provides a buffer or stop. An obvious equivalent would be a series of rock-arms with stop-pins, one for each type-hammer.

In the normal operation of the machine the first thing that is accomplished by the handle 5 is to elevate the frame 22 and its carried totalizer-trains out of mesh with the item-trains. The next thing is to trip the type-hammers. When the totalizer-frame is elevated through the link 42, lever 43, &c., the yoke 47 is raised out of the path of the shoulders 48 on the type-hammers and permits said type-hammers to strike their blow and make a printing impression.

Figure 1:
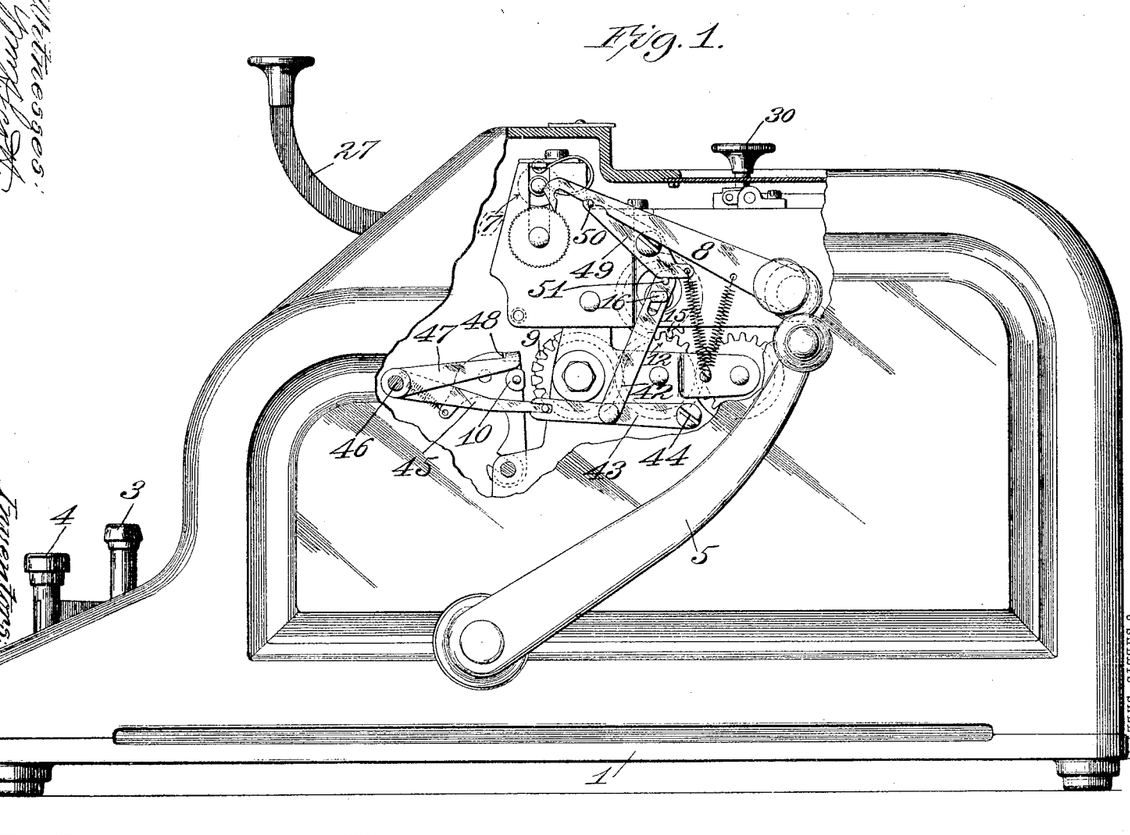
Figure 1 is a side elevational view of our improvement in adding-machines, a part of the casing being broken away to more clearly show the interior.

*Rendering the paper-feed inoperative.*—As before described, the pawl 8 coöperates with and drives the ratchet-wheel of the paper-feed rollers at every ordinary operation of the handle 5. Referring to Figs. 1 and 6, it will be seen that the spring-pressed lever 49 carries a stud 50 on its upper end, which stud coöperates with a cam-face in the lower edge of lever 8. The lower end of lever 49 coöperates with a pin 51 on the link 42. In the ordinary operation of the machine the totalizer-trains are lifted and link 42 elevated, which depresses the stud 50 out of engagement with the paper-feeding pawl 8 and permits said pawl to engage and actuate its coöperating ratchet-wheel. When the totalizer-trains are left in engagement with the item-trains upon the operation of the error-key it will be obvious that stud 50 will not be depressed out of engagement with the pawl 8, but will remain in position to render said pawl inoperative when the operating-handle 5 is manipulated. Thus while the operating-handle reciprocates the paper-feeding pawl 8 in the usual manner said pawl is not in operative relation to its coöperating ratchet-wheel, and consequently the paper is not fed when an error is corrected on the keyboard. The record will not have a blank space to indicate an error having been made on the keyboard, the paper remaining stationary, so that the next item printed thereon will strike in its proper position immediately under the preceding item.

*Locking the total-key.*—The lever 31 is provided with an extension 52, whose forward end is preferably bent at right angles and provided with a cam-face 53, (see Fig. 7,) which coöperates with a pin 54 on the locking-pawl 29, so that whenever the error-key is depressed the pawl 29 will be thrown inwardly to place its shoulder under the total-key 27 and prevent said total-key from being operated. This result is the same as that produced by the cam-link 28, only that the cam-link 28 depends for its operation upon the movement of the operating-handle 5 in order to prevent the total-key from being operated whenever the handle 5 is in other than home position. The error-key also locks the total-key against operation, but necessarily does it before the handle 5 is operated.

Figure 2:
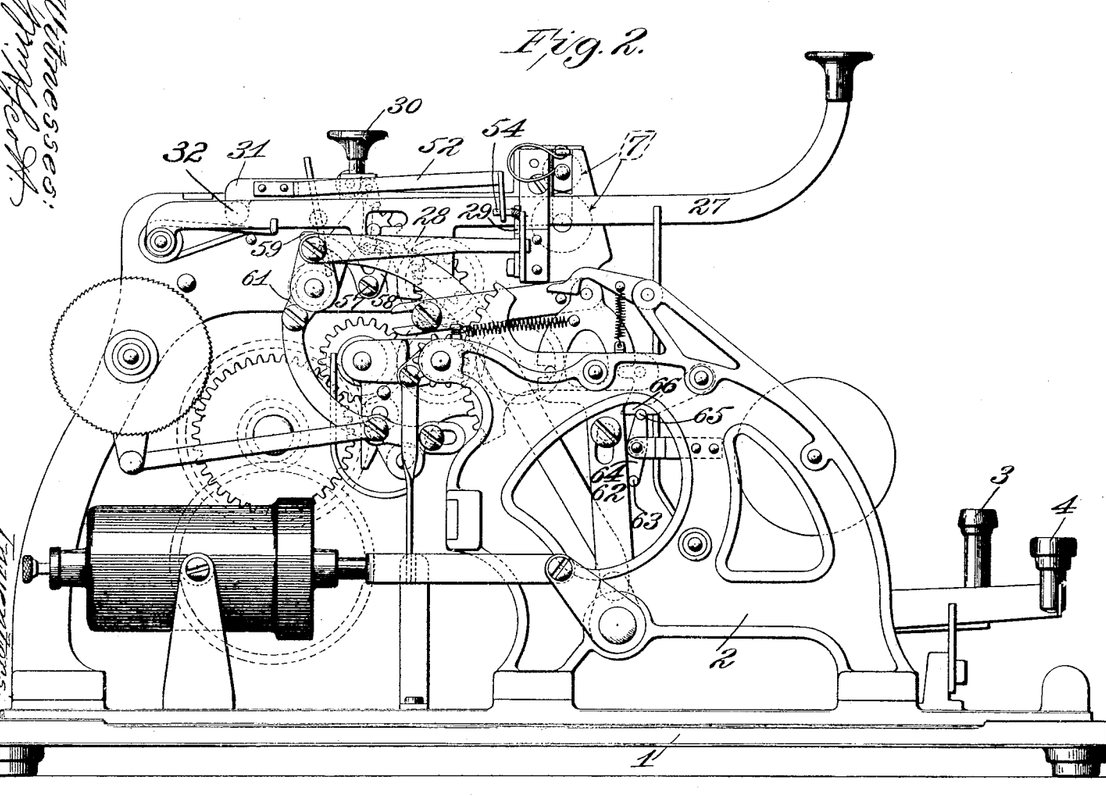
Fig. 2 is a side elevational view as seen from the opposite side of the machine with the casing removed.

*Locking the error-key.*—Referring to Fig. 6, it will be seen that a spring 55 is connected to the downward extension 56 of lever 31, which downward extension is provided with a shoulder forming a hook. With this hooked lower end coöperates a lever pivoted at 57, said lever being substantially in the form of a bell-crank lever, having a hooked end 58 and a curved striking end 59. A spring 60 connects the parts 56 and 58 and holds them in such position that when the error-key is depressed the hooked end of the bell-crank lever will engage the shouldered extension of the error-key and hold said error-key down in a locked position until the hooked end of the bell-crank lever is forced out of engagement therewith. This latter is accomplished by the crank-arm 61 on the shaft 24, which crank-arm, as shown in Fig. 2, is connected to and operates the ribbon-spool. When the error-key is depressed, the curved extension 59 falls down in the path of the crank-arm 61, whose normal position is indicated in dotted lines in Fig. 6, and when the handle is operated said crank-arm engages the curved extension 59 and lifts it to its normal position, which when established releases the error-key and permits the spring 55 to restore said error-key. In its restored position the error-key holds the bell-crank lever and its curved extension 59 out of the path of the crank-arm 61, so that at each operation of the machine the crank-arm 61 will only slightly engage and hold the extension 59.

*Retaining the total in the machine.*—In the ordinary operation of the machine, as above described, in the absence of our improved error-key the operation of the total-key will result in the printing of the items on a strip of paper, after which the machine will automatically clear itself, there being no means of retaining the total in the machine. By the presence of our improved error-key and its connections if it is desired to obtain a total and retain said total in the machine after a series of items are set up on the keyboard and entered in the totalizer the total-key is operated as usual, after which and before the handle 5 is manipulated the error-key is operated, so that when the handle is pulled forward the total will be impressed on the strip of paper, and instead of the machine clearing itself the total will be retained in the totalizer and carried forward. This operation will be understood from what has been said before concerning the error-key holding the totalizer-trains in mesh with the item-trains. However, to describe this operation more specifically it is only necessary to state that the operation of obtaining a total is to reversely rotate all of the totalizer-trains by the movement of the handle 27, so as to set the item-trains a proportionate distance, and the meshed type-wheels with their double set of type will present in the printing-line the total as it appears in the totalizer. In the ordinary operation of the machine when the handle is pulled forward the type-hammers make a printing impression of the total on the strip of paper, and then raising the totalizer-trains, which have been restored to zero to move the item-trains to indicate the total, said totalizer-trains will be at a zero position, and the handle after the printing impression will restore the item-trains also to zero position, which will result in clearing the machine. If the totalizer-lever is operated when the totalizer-trains are in mesh with the item-trains, it will be seen from the above that the totalizer-trains are moved to a zero position and the item-trains are moved to a position corresponding to the former position of the totalizer-trains. Should the error-key be now operated, (before the handle is pulled,) so as to prevent the totalizer-trains from being thrown out of mesh with the item-trains, it will be obvious that the total will be printed by the type-hammers, and when the item-trains are restored to zero position, as they will be by the continued movement of the handle 5, the meshed totalizer-trains will be moved back to exactly the position they occupied before the total-key was operated, and consequently the total will be retained in the machine.

In the above description of the operation of the error-key we referred to the fact that the yoke 47 would prevent the type-hammers from printing whenever the error-key was operated, and with respect to retaining the total in the machine we have just stated that if the error-key was operated after the total-key was depressed the total would be printed on the strip of paper and retained in the totalizer. It is obvious that if this is done some means must be provided for permitting the type-hammers to deliver their impacting blows after and during the time that the total-key is depressed. In the construction of the patented machine there is a cam-arm 62, which is employed in connection with the type-wheels in printing zero characters to the right of any figure to be printed. This arm when the total-key is depressed swings on a pivot at its lower end, so that its upper end comes in contact with a stud 63 on the lower end of a lever 64. This lever is mounted in suitable brackets secured to the framing of the machine and carries at its upper end a stud 65, which normally rests in a notch in the end of a rock-arm 66, secured to the rock-shaft 46. Thus when the total-key is depressed the stud 65 is moved out of the notch in the end of rock-arm 66 and elevates the yoke 47 above the shoulders 48, so that irrespective of the fact that the error-key may be subsequently operated before the handle is pulled the type-hammers will make their printing impression in the ordinary way. This rocking of shaft 46, which results in enabling a printing impression to be made of the total when the error-key is operated to retain the total in the machine, also throws the paper-feeding mechanism in commission. It was stated before that whenever the error-key was operated the paper-feeding mechanism was rendered inoperative; but it is obvious that when a total is printed and retained in the machine the paper should be fed. Otherwise the next item would be printed over the total which was taken and retained in the machine. To permit the paper-feeding mechanism to operate when the total is retained in the machine, the rock-shaft 46, which is operated by the depression of the total-key, will through the connected members 45 and 43 raise the link 42, the elongated slot in link 42, which receives the end of the shaft 16, permitting this without disturbing said shaft and its carried totalizer-wheels. The elevation of link 42 will cause the stud 51 to rock the lever 49 and move the stud 50 from engagement with the paper-feeding pawl 8, as in the ordinary operation of the machine, so that said paper-feeding pawl 8 will when the handle is pulled advance the strip of paper the proper distance.

We are aware that in adapting our invention to the particular machine shown and described in the Hopkins Patent No. 683,939 we have been obliged to meet conditions as they exist in said patented machine, and in illustrating one form of mechanism for accomplishing the results above described we do not wish to be limited to the exact form of that mechanism, except as such limitations are expressed in the claims, as there are various modifications of our improvement which could be made and used without in the least departing from the nature and principle of our invention. Furthermore, while we have described our improvements as being applicable to one particular type of machine the said improvements may be applicable to other types of machines, and therefore we do not wish to be limited in the application of our improvements to the particular type of machine herein referred to.

In the above we have referred to an "operating-handle" as a medium through which power is transmitted to drive the machine. It is obvious that instead of a handle, which enters into the construction of a manually-operable machine, a motor could be employed, and therefore in the following claims we will refer to the shaft upon which the handle 5 is mounted as a "power-driven" shaft, and such expression will be understood as including within its meaning a manually or machine driven shaft.

We are aware that many minor changes in the construction, arrangement, and combination of the several parts of our device can be made and substituted for those herein shown and described without in the least departing from the nature and principle of our invention.

Having thus described our invention, what we claim as new, and desire to secure by Letters Patent, is—

1. In an adding-machine the combination with a totalizer, of means for introducing items therein, and other means for taking the last item introduced out of the totalizer-recorder mechanism, said last-mentioned means preventing a record being made of said last item; substantially as described.

2. In an adding-machine, the combination with a totalizer, of means for introducing items therein, a power-driven shaft for effecting the retention of the last item in the totalizer, and an error-key capable of coöperating with the totalizer, whereby upon the operation of the said error-key and the shaft, said shaft instead of retaining the last item in the totalizer, takes out the last item only from the totalizer; substantially as described.

3. In an adding-machine, the combination with a totalizer, of means for introducing items therein, transferring devices coöperating therewith, a power-driven shaft for effecting the retention of the last item in the totalizer, and an error-key coöperating with the totalizer and said transferring devices, rendering the latter inoperative, whereby upon the operation of the said error-key and the shaft, said shaft instead of retaining the last item in the totalizer, takes the last item out of the totalizer; substantially as described.

4. In an adding-machine, the combination with totalizer-wheels, of transferring devices means for tripping said devices to advance a wheel of higher order from the next adjacent wheel of lower order, means for successively moving said totalizer-wheels in one direction to accumulate items therein, other means for tripping all of said transferring devices, said last-mentioned means also connecting said totalizer-wheels with a power-driven shaft, and a power-driven shaft for reversely rotating said totalizer-wheels to take out the last item introduced therein; substantially as described.

5. In an adding-machine, the combination with totalizer and item trains, means for driving the same, transferring devices coöperating with the totalizer-trains, means for keeping said trains in mesh, said last-mentioned means, when operated also rendering the transferring devices inoperative, and means for restoring the item-trains to zero; substantially as described.

6. In an adding-machine, the combination with totalizer-gears 15, of gears 12 for driving the same, keys 4 for operating gears 12 a predetermined distance, a pivoted frame in which the gears 15 are carried, a power-driven shaft for rocking said frame, and an error-key for rendering said power-driven shaft inoperative with respect to said frame; substantially as described.

7. In an adding-machine, the combination with totalizer-gears, of a pivoted frame in which same are mounted, a rock-shaft for rocking said frame, a movable element on said rock-shaft, and having a cam-face engaging said frame, and means for moving said element into and out of engagement with said frame; substantially as described.

8. In an adding-machine, the combination with totalizer-gears, of a pivoted frame in which same are mounted, a rock-shaft for rocking said frame, a movable element on said rock-shaft, and having a cam-face engaging said frame, a lever engaging said movable element, and an error-key coöperating with said lever; substantially as described.

9. In an adding-machine, the combination with totalizer-gears, of a pivoted frame in which same are mounted, a rock-shaft for rocking said frame, a movable element on said rock-shaft, and having a cam-face engaging said frame, a lever in engagement with said movable element and having a cam-face, a rock-shaft carrying a rock-arm engaging the cam-face of the lever, and an error-key for rocking said shaft; substantially as described.

10. In an adding-machine, the combination with totalizer-gears, of transferring devices coöperating therewith and comprising rack-bars having tripping-pawls mounted thereon, and means for engaging and tripping all of said pawls simultaneously; substantially as described.

11. In an adding-machine, the combination with totalizer-gears 15 carrying tripping-arms 18, of pawls 19, detaining-pawls 20 in engagement with the pawls 19, and with sliding rack-bars 21, said rack-bars carrying the pawls 19, a rock-shaft 36 for engaging and operating all of the pawls 19 to simultaneously trip and release the rack-bars, and means for operating the shaft 36; substantially as described.

12. In an adding-machine, the combination of printing-type and type-hammers, of means for vibrating said hammers, and other means for interrupting all of said hammers and preventing them from making a printing impression; substantially as described.

13. In an adding-machine, the combination of type-wheels, of means for driving same, type-hammers, and an error-key and connected mechanism for preventing said type-hammers from making printing impression when said hammers are vibrated; substantially as described.

14. In an adding-machine, the combination of type-wheels, of means for driving same, type-hammers, an error-key and connected mechanism for preventing said type-hammers from making a printing impression when said hammers are vibrated, and a power-driven shaft for causing said hammers to make a printing impression, said power-driven shaft also restoring the type-wheels to normal position; substantially as described.

15. In an adding-machine, the combination of totalizer and type wheels, of means for keeping said wheels connected, and means for restoring the type-wheels, whereby the item presented in the printing-line and introduced into the totalizer will, upon the restoration of the type-wheels, be taken out of the totalizer; substantially as described.

16. In an adding-machine, the combination of totalizer and type wheels, of keys for actuating the same in one direction, means for keeping said wheels connected, and a power-driven shaft for restoring the type-wheels whereby the item presented in the printing-line and introduced into the totalizer will, upon the restoration of the type-wheels, be taken out of the totalizer; substantially as described.

17. In an adding-machine, the combination of totalizer and type wheels, of keys for driving same in one direction, a power-driven shaft for moving same in an opposite direction, means for keeping said wheels connected while being operated by the power-driven shaft, whereby the item presented in the printing-line and introduced into the totalizer will, upon the restoration of the type-wheels, be taken out of the totalizer, type-hammers for making a printing impression from said type-wheels, said type-hammers being operated from said power-driven shaft, and means for preventing said type-hammers from delivering a printing blow when the totalizer and type wheels are jointly operated by the power-driven shaft; substantially as described.

18. In an adding-machine, the combination with printing-type and type-hammers, of projections carried by said hammers, a yoke movable into and out of the paths of said projections, and means for operating said yoke; substantially as described.

19. In an adding-machine, the combination with printing-wheels 9, of type-hammers 10 coöperating therewith, shoulders 48 on said type-hammers, a rock-shaft 46, a yoke 47 on said shaft and capable of being moved into and out of the paths of said shoulders, and means for rocking said shaft 46; substantially as described.

20. In an adding-machine, the combination with printing-type and type-hammers, of projections carried by said hammers, stops movable into and out of the paths of said projections, a totalizer, and a connection between said stops and said totalizer; substantially as described.

21. In an adding-machine, the combination with printing-type and type-hammers, of projections carried by said hammers, stops movable into and out of the paths of said projections, a totalizer, a connection between said stops and said totalizer, a pivoted frame carrying totalizer-wheels, means for moving said frame, and a connection between said frame and said stops which connection moves the stops out of the paths of the type-hammers when the frame is elevated; substantially as described.

22. In an adding-machine, the combination of printing-type and type-hammers, of means for vibrating said type-hammers, other means for interrupting said hammers and preventing them from making a printing impression, a paper-feeding mechanism, and means for preventing said mechanism from operating during the time that the type-hammers are restrained; substantially as described.

23. In an adding-machine, the combination of type-wheels, of means for driving same, type-hammers, an error-key and connected mechanism for preventing said type-hammers from making a printing impression when said hammers are vibrated, a paper-feeding mechanism, and means for preventing said mechanism from operating during the time that the type-hammers are restrained; substantially as described.

24. In an adding-machine, the combination of type-wheels, of means for driving same, type-hammers, an error-key and connected mechanism for preventing said type-hammers from making a printing impression when said hammers are vibrated, a power-driven shaft for causing said hammers to make a printing impression, said power-driven shaft also restoring the type-wheels to normal position, a paper-feeding mechanism, and means for preventing said mechanism from operating during the time that the type-hammers are restrained; substantially as described.

25. In an adding-machine, the combination of totalizer and type wheels, of means for keeping said wheels connected, means for restoring the type-wheels, whereby the item presented in the printing-line and introduced into the totalizer, will, upon the restoration of the type wheels, be taken out of the totalizer, a paper-feeding mechanism, and means for preventing said mechanism from operating during the time that the type-hammers are restrained; substantially as described.

26. In an adding-machine, the combination of totalizer and type wheels, of keys for actuating the same in one direction, means for keeping said wheels connected, a power-driven shaft for restoring the type-wheels whereby the item presented in the printing-line and introduced into the totalizer will, upon the restoration of the type-wheels, be taken out of the totalizer, a paper-feeding mechanism, and means for preventing said mechanism from operating during the time that the type-hammers are restrained; substantially as described.

27. In an adding-machine, the combination of totalizer and type wheels, of keys for driving same in one direction, a power-driven shaft for moving same in opposite directions, means for keeping said wheels connected while being operated by the power-driven shaft, whereby the item presented in the printing-line and introduced into the totalizer will, upon the restoration of the type-wheels, be taken out of the totalizer, type-hammers for making a printing impression from said type-wheels, said type-hammers being operated from said power-driven shaft, means for preventing said type-hammers from delivering a printing blow when the totalizer and type wheels are jointly operated by the power-driven shaft, a paper-feeding mechanism, and means for preventing said mechanism from operating during the time that the type-hammers are restrained; substantially as described.

28. In an adding-machine, the combination with a totalizer and item-trains, of a paper-feeding pawl, and means for rendering said pawl inoperative when the totalizer and item-trains are in mesh; substantially as described.

29. In an adding-machine, the combination with a movable frame carrying totalizer-wheels, item-wheels designed to mesh with said totalizer-wheels, a paper-feeding pawl, and means operated by the movable frame for moving said pawl into and out of operative position; substantially as described.

30. In an adding-machine, the combination with a movable frame carrying totalizer-wheels, item-wheels designed to mesh with said totalizer-wheels, a paper-feeding pawl, and a lever 49 operated by the movable frame, said lever having a projection coöperating with cam-recesses in the paper-feeding pawl; substantially as described.

31. In an adding-machine, the combination with totalizer-trains, of a total-key, a power-driven shaft, and means for taking out the last item introduced into the totalizer-trains, said means locking the total-key against operation until the act of removing the last item has been completed; substantially as described.

32. In an adding-machine, the combination with totalizer-trains, of keys for driving the same, a total-key, a power-driven shaft, and an error-key for locking the total-key against operation until the power-driven shaft has been operated; substantially as described.

33. In an adding-machine, the combination with a total-key, of a detaining-pawl 29 provided with a projection 54, an arm 52 having a cam-face 53 coöperating with the projection 54, and an error-key for operating said arm 52; substantially as described.

34. In an adding-machine, the combination with totalizer and item trains, keys for moving the same in one direction, an error-key for keeping said trains in mesh after an item is introduced into the totalizer-trains through the item-trains, means for locking the error-key in position until the power-driven shaft has completed its movement, and a power-driven shaft for reversely rotating the item-trains and restoring them to zero, whereby the meshed totalizer-trains will be freed from the last item; substantially as described.

35. In an adding-machine, the combination with an error-key having a hook projection 56, a lever 58 59 coöperating with said hook projection, and a rock-shaft 24 having a crank-arm for coöperating with the member 59 of said lever; substantially as described.

36. In an adding-machine, the combination with an error-key having a hook projection 56, a lever 58 59 coöperating with said hook projection, the member 58 of said lever having a shoulder, a spring 60 connecting said hook projection 56 and said member 58, and a rock-shaft 24 having a crank-arm for coöperating with the member 59 of said lever; substantially as described.

37. In an adding-machine, the combination with recording devices and a totalizer capable of being moved in one direction to record and accumulate items, an error-key and power-shaft for taking a wrong item out of the totalizer, said error-key preventing a record being made of said wrong item, a total-key for presenting the total of said items in the printing-line of the recording devices, the subsequent operation of said error-key keeping the recording devices and totalizer in mesh after the total is in the printing-line, whereby when the power-shaft restores the recording devices to normal position the total is reëntered in the totalizer; substantially as described.

38. In an adding-machine, the combination with type-hammers, of means for preventing them from delivering a printing blow, a total-key, and a connection between the total-key and said restraining means, whereby when the total-key is operated said restraining means are rendered inoperative; substantially as described.

39. In an adding-machine, the combination with type-hammers, of stops normally in their paths of movement to prevent the delivery of printing blows, a totalizer for moving said stops, and a total-key which also moves said stops out of the paths of the type-hammers independently of the movement of the totalizer; substantially as described.

40. In an adding-machine, the combination with a paper-feeding pawl, a totalizer for rendering said pawl operative, and a total-key which also renders said pawl operative independently of the totalizer; substantially as described.

41. In an adding-machine, the combination with a movable totalizer, type-hammers and a paper-feeding pawl, of means operated by the totalizer for rendering said devices operative, a total-key, and means operated by the total-key for rendering said type-hammers and paper-feeding pawl operative independently of the movement of the totalizer; substantially as described.

42. In an adding-machine, the combination with a totalizer, of means for partly introducing items therein, and means for taking the last partly-introduced item out of the totalizer, said last-mentioned means preventing a record being made; substantially as described.

43. In an adding-machine, the combination with a totalizer, of means for partly introducing items therein, transferring devices coöperating therewith to fully introduce the items in the totalizer, a power-driven shaft for effecting the retention of the last item in the totalizer, and an error-key coöperating with the totalizer and said transferring devices, rendering the latter inoperative whereby upon the operation of said error-key and said shaft, said shaft instead of retaining the last item, whether partly or wholly introduced in the totalizer, takes said last item out of the totalizer; substantially as described.

In testimony whereof we hereunto affix our signatures, in the presence of two witnesses, this 10th day of October, 1902.

ROBERT E. WAGELEY.
JOHN F. STOCKE.

Witnesses:
EUGENE PHILLIPS,
GEORGE BAKEWELL.